(12) United States Patent
Matera

(10) Patent No.: US 7,316,479 B1
(45) Date of Patent: Jan. 8, 2008

(54) INTEGRAL AND BIASED LENS INTERCHANGE SYSTEM

(76) Inventor: Pasquale Matera, 164 Floral Ave., Plainview, NY (US) 11803

( * ) Notice: Subject to any disclaimer, the term of this patent is extended or adjusted under 35 U.S.C. 154(b) by 0 days.

(21) Appl. No.: 11/523,025

(22) Filed: Sep. 19, 2006

(51) Int. Cl.
*G02C 1/00* (2006.01)
(52) U.S. Cl. .......................... 351/86; 351/83
(58) Field of Classification Search .................. 351/86, 351/85, 83, 103, 106, 90, 92, 41
See application file for complete search history.

(56) References Cited

U.S. PATENT DOCUMENTS 2,574,839 A * 11/1951 Pelzer ........................ 351/86
6,601,954 B2 * 8/2003 Menon ....................... 351/86

* cited by examiner

*Primary Examiner*—Hung Xuan Dang
(74) *Attorney, Agent, or Firm*—Arent Fox LLP

(57) ABSTRACT

An integral and biased lens interchange system configured to be used with various types of eyewear. The eyewear includes at least one lens and a frame having a rim supporting the at least one lens. The interchange system includes a biasing member incorporated in at least one of a bridge of the frame and the rim of the frame.

26 Claims, 13 Drawing Sheets

LENS INSTALLATION

LENS REMOVAL first second

LENS INSERTION

FRAME/SPRING DEFLECTION

LENS INSERTION

FRAME/SPRING
COMPRESSION

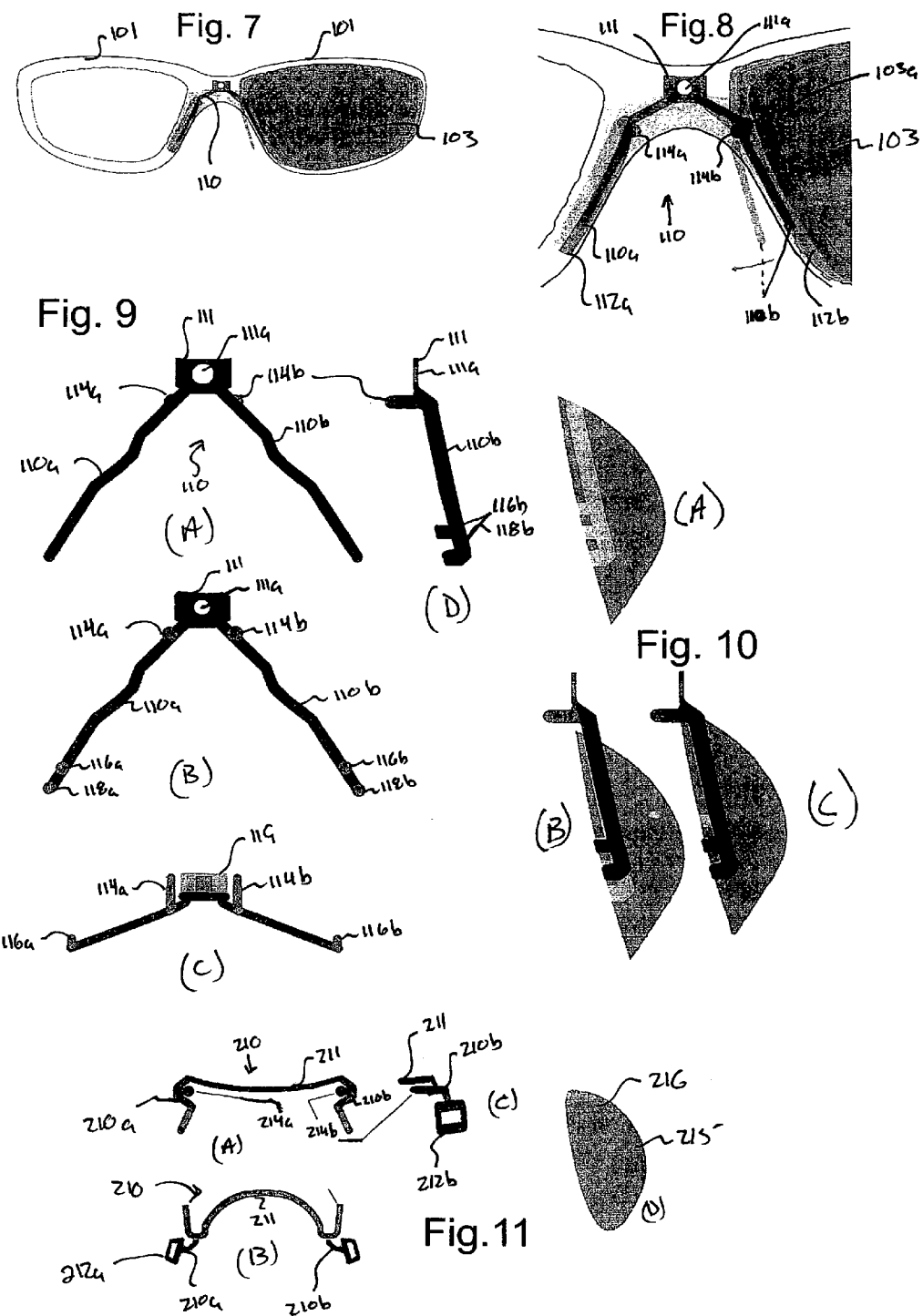

Fig. 12
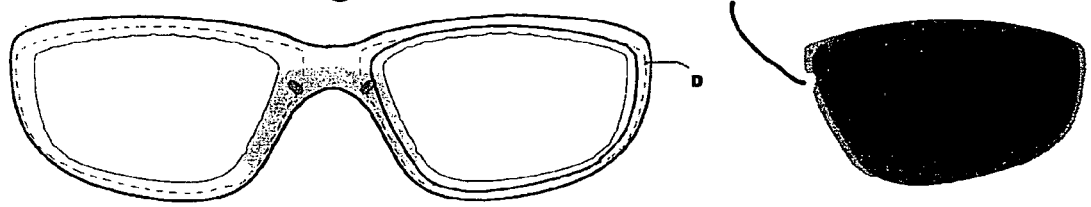
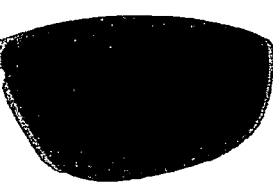
Fig. 13
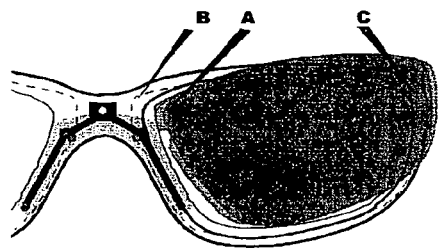
Fig. 14
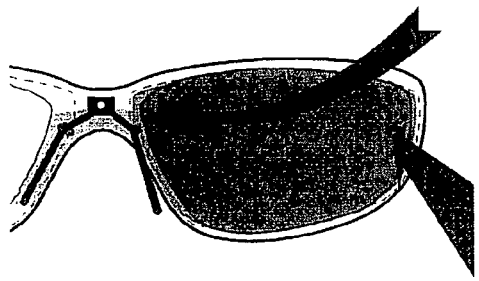
Fig. 15
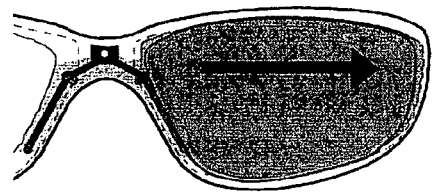

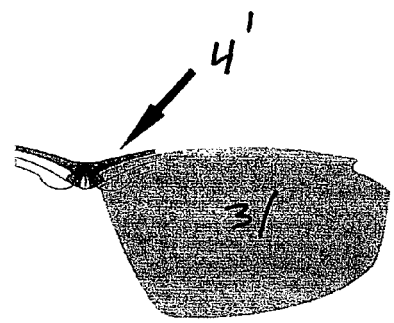
Fig. 16A
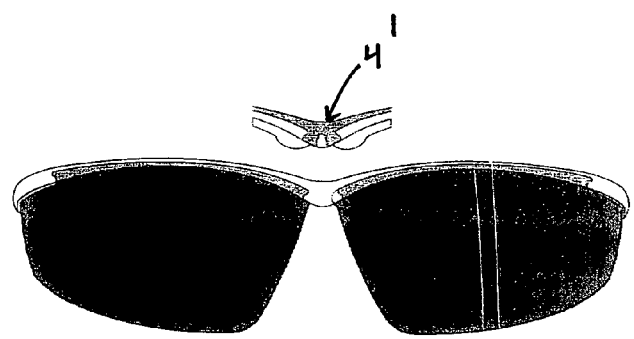
Fig. 16B
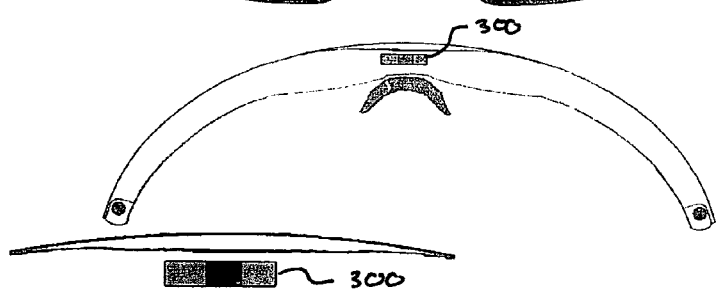
Fig. 16C
Fig. 16D
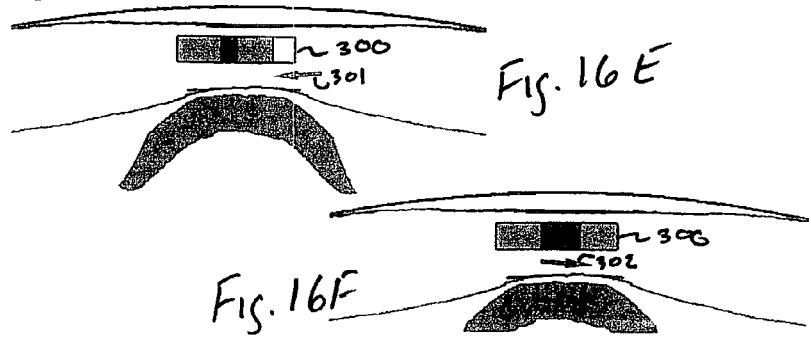
Fig. 16E
Fig. 16F

INTEGRAL AND BIASED LENS INTERCHANGE SYSTEM

BACKGROUND OF THE INVENTION

1. Field of the Invention

The present invention is directed to a lens interchange system for glasses and goggles. More specifically, the present invention is directed to an integral biasing lens interchange system for glasses and goggles and a method of using the same.

2. Description of the Related Art

Currently, sunglasses are available which are promoted as having interchangeable lenses. Usually, such sunglasses comprise a half frame, so that the lenses may be slid out of the top of the frame in a downward or outward direction, and replaced with another lens by performing the opposite action. Alternately, sunglasses promoted as having removable lenses may have a full frame. However, in order to change the lenses in a full frame, one must remove and insert the lenses through a thin slot provided in the frame. Thus, replacing the lens becomes a rather difficult process. Therefore, there is need for sunglasses, glasses or goggles having interchangeable lenses, wherein the lenses can be easily and quickly replaced as necessary and under any condition.

SUMMARY OF THE INVENTION

The present invention is therefore directed to an integral biasing lens interchange system for glasses and goggles, and a method of using the same, which substantially overcomes one or more of the problems due to the limitations and disadvantages of the related art.

At least one of the above and other features and aspects of the present invention may be realized by providing an integral biasing lens interchange system for glasses. Preferably, the glasses will include a frame having one or two eyewires or rims, each eyewire or rim (hereinafter referred to as "eyewire(s)") being a component of the frame that encircles one lens, and an integral biasing molded spring provided in a groove of each eyewire that compresses to facilitate insertion and removal of the corresponding lens.

In the integral biasing lens interchange system for glasses, the lenses may be inserted further into the portion of the eyewires having the integral biasing molded springs than in a portion furthest from the springs by the compression of the springs. The lenses may then be pushed back and centered in the eyewires by the action of the springs when released.

In the integral biasing lens interchange system for glasses, the lenses may be removed from the eyewires by pushing the lenses in the direction of compression of the springs to compress the springs. Then, each lens is removed by pulling or otherwise slipping the portion of the lens furthest from the springs.

At least one of the above and other features and aspects of the present invention may be realized by providing an integral biasing lens interchange system for glasses, including an eyeglass frame having one or two eyewires. Each eyewire is preferably provided with a deep groove for securely holding a lens. The deep groove is provided with an integral biasing molded spring that compresses to facilitate insertion and removal of the respective lens.

In the integral biasing lens interchange system for glasses, each eyewire may further be provided with a second deep groove at a portion thereof furthest from the first deep groove.

In the integral biasing lens interchange system for glasses, the integral biasing molded spring may be compressed by a lens to facilitate the lens to be further inserted into the side of the eyewire having the biasing molded spring than the side furthest therefrom. Accordingly, upon releasing the lens, the biasing action of the spring pushes the lens back into the second deep groove to be centered and secured in the eyewire.

In the integral biasing lens interchange system for glasses, the integral biasing molded spring may be compressed to facilitate a lens inserted into the first deep groove provided with the integral biasing molded spring to be slid slightly in the direction of compression of the spring. As such, the portion of the lens furthest from the spring is permitted to clear a rim of the second deep groove provided in the portion of the eyewire furthest from the spring and to be removed from or inserted into the eyewire.

In the integral biasing lens interchange system for glasses, each eyewire may be further provided with a ledge along an inner perimeter thereof on which the lens rests, and an outer rim disposed along an outer perimeter thereof to prevent the lens from falling out.

At least one of the above and other features and aspects of the present invention may be realized by providing an integral biasing lens interchange system for glasses including an eyeglass frame having one or two eyewires. Each eyewire is provided at one side with a deep groove for securely holding a lens. The deep groove disposed at one side of each eyewire is provided with an integral biasing molded spring. Upon compression of the spring, the integral biasing molded spring pushes slightly out of the respective eyewire, allowing the respective lens to be slid slightly in the direction of compression of the spring. Thus, the portion of the lens furthest from the spring is able to clear the eyewire and be removed therefrom.

At least one of the above and other features and aspects of the present invention may be realized by providing an integral biasing lens interchange system for glasses, including an eyeglass frame having one or two eyewires. Each eyewire is provided with a deep groove at a portion thereof for securely holding a lens. Each lens is provided with an integral biasing molded spring that compresses to facilitate the respective lens to be inserted into and removed from the eyewire.

At least one of the above and other features and aspects of the present invention may be realized by providing a method for interchanging lenses of glasses having an integral biasing lens interchange system. The method could include the steps of inserting a lens by pushing a side of the lens against an integral biasing molded spring provided within a groove of an eyewire of the glasses to compress the spring; releasing the lens wherein the spring pushes the lens into place; and removing the lens by pushing the lens against the integral biasing molded spring provided within the groove of the eyewire to compress the spring and pushing a side of the lens furthest from the spring out of the eyewire.

An additional embodiment of the invention may be realized by providing a separate part which would provide the spring action and would be secured and or attached to the frame by any suitable means such as gluing, screwing, ultrasonically welding, snap fitting, or press fitting to the frame. The part may be made of any suitable material such as plastic, metal or a combination of materials which best suits the application or embodiment.

At least one of the above and other features and aspects of the present invention may be realized by providing a lens interchange system for glasses that includes an eyeglass frame having two eyewires or rims, each eyewire being the component of the frame that encircles one lens in a manner similar to that of the previously described embodiments. The frame is provided with an interchange or secondary spring nose part that is incorporated into the bridge area of the frame which rests on the nose of the wearer during normal use. While the interchange part may be affixed to the frame by a base using a fixing member that passes through the base and into the frame member, it is within the scope and spirit of the invention to form the frame with a groove instead of the insert or boss on the inner or outer surface of the frame wherein the fixing member passes through the base and frame to attach the features to each other.

The interchange part would preferably include a pair of legs extending away from a base in a diverging manner. The interchange part can be manufactured from any suitable and moldable material, such as, for example, a molded plastic, metal and the like. Moreover, a nose piece or pad cab slidably be inserted onto or over a substantial portion of a corresponding leg. Ideally, each leg should include an upper post extending away therefrom, the upper post functioning as a lens hook or lock. Each leg of the interchange part should be biasable away from and back toward the corresponding lens wherein a portion of the leg extending away from the upper post in a direction furthest from the base is the portion of the interchange part which is biasable.

It is also envisioned that in addition to the upper post, each corresponding leg includes a pair of lower posts extending in common direction as the upper post. While the upper post is not to be covered by the nose piece, the lower posts are covered by the nose piece.

Upon inserting a leg of the interchange part into the groove of the nose piece, while the lower posts are covered by the nose piece, the upper post should not covered by the nose piece and should extend freely away therefrom. The upper post operates to retain the lens in the frame by engaging a notch defined in the lens. Thus, when the nose piece is biased away from the frame or toward the other nose piece, the upper post slides out of the notch, thereby releasing the lens, after which the wearer can remove the lens from the frame.

At least one of the above and other features and aspects of the present invention may be realized by providing a method for interchanging lenses of glasses having an integral biasing lens interchange system. The method includes the steps of providing an eyeglass frame having two eyewires, each eyewire having a first deep groove and a second deep groove at opposing sides thereof for securely holding a lens; providing the first deep groove on one side of each eyewire with an integral biasing molded spring that compresses to allow insertion and removal of the respective lens; inserting a lens by pushing a side of the lens into the first deep groove having the integral biasing molded spring provided therein to compress the spring; seating the lens into the eyewire; releasing the lens, wherein the biasing action of the spring moves the lens into the second deep groove provided opposite the first deep groove; and removing the lens by pushing the lens in the direction of compression of the integral biasing spring to compress the spring, wherein the portion of the lens in the second deep groove clears the second deep groove, and pushes the lens out of the eyewire.

At least one of the above and other features and aspects of the present invention may be realized by providing an integral biasing lens interchange system, including a frame having as an integral part thereof at least one spring recurve portion, wherein the spring recurve portion of the frame has spring-like characteristics, to allow extension and compression of the portion of the frame.

Each of the above embodiments may be applied to goggles. In addition, in the above embodiments, the glasses, goggles, or frames may be provided with two separate eyewires, for holding two separate lenses, or the glasses, goggles, or frames may be provided with one eyewire for holding one lens, and the lens(es) may include more than one lens layer. Further, the glasses, goggles, frames, or eyewire(s) of the above embodiments may be formed of molded plastic, metal, one or more metallic substance, or any other suitable material.

BRIEF DESCRIPTION OF THE DRAWINGS

The above and other features and aspects of the present invention will become more apparent to those of ordinary skill in the art by describing in detail exemplary embodiments thereof with reference to the attached drawings in which:

FIG. 7 illustrates a front view of a lens interchange system according to a fifth embodiment of the present invention;

FIG. 8 illustrates an enlarged view of the lens interchange system illustrated in FIG. 7;

FIGS. 9A-D illustrate various views of a molded plastic interchange part used in the lens interchange system illustrated in FIG. 7;

FIGS. 10A-C illustrate steps taken during a method of inserting the interchange part illustrated in FIGS. 9A-D into a corresponding nose of the eyeglasses;

FIGS. 11A-D illustrate plan views of a metallic embodiment of the interchange part used in the lens interchange system illustrated in FIG. 7;

FIGS. 12-15 illustrate a method of operating the lens interchange system according to the fifth embodiment of the present invention; and FIGS. 16A-F illustrate a modification of the first embodiment.

DETAILED DESCRIPTION OF PREFERRED EMBODIMENTS

Figure 1A:
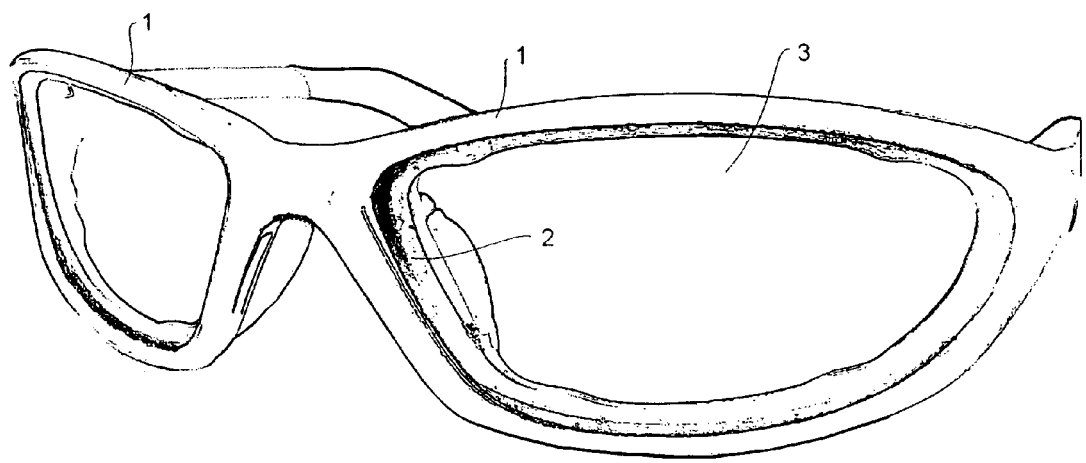
FIGS. 1A-1C illustrate perspective views of an integral biasing lens interchange system according to a first embodiment of the present invention.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions may be exaggerated for clarity of illustration. Like reference numerals refer to like elements throughout.

Figure 1B:
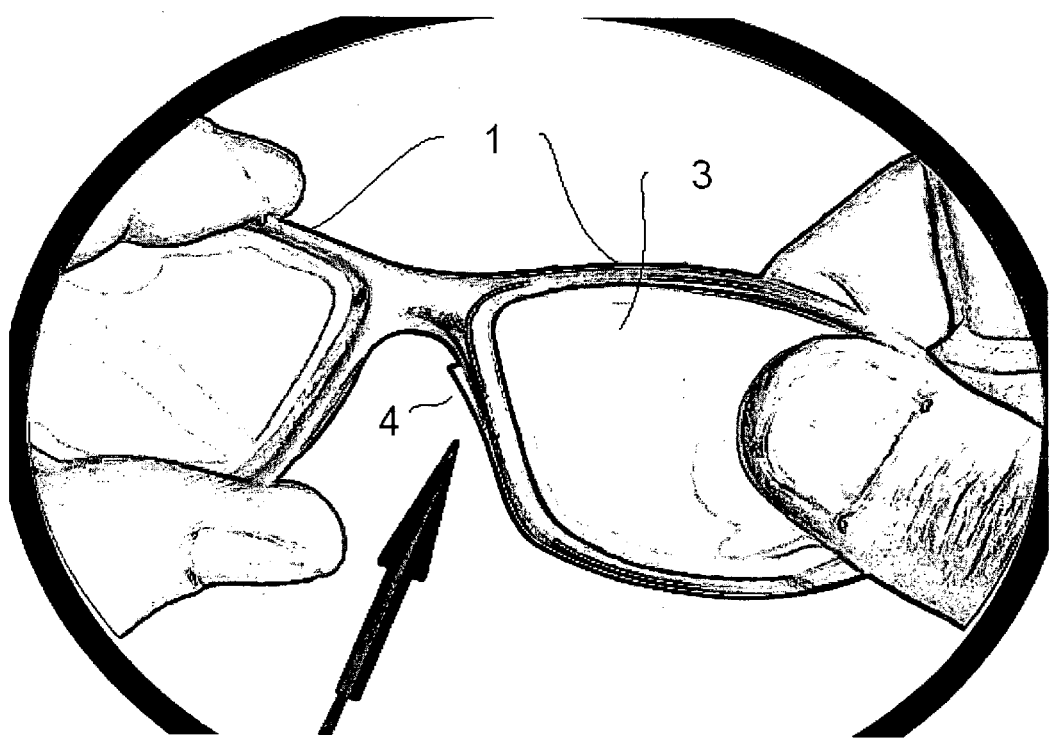
Figure 1C:
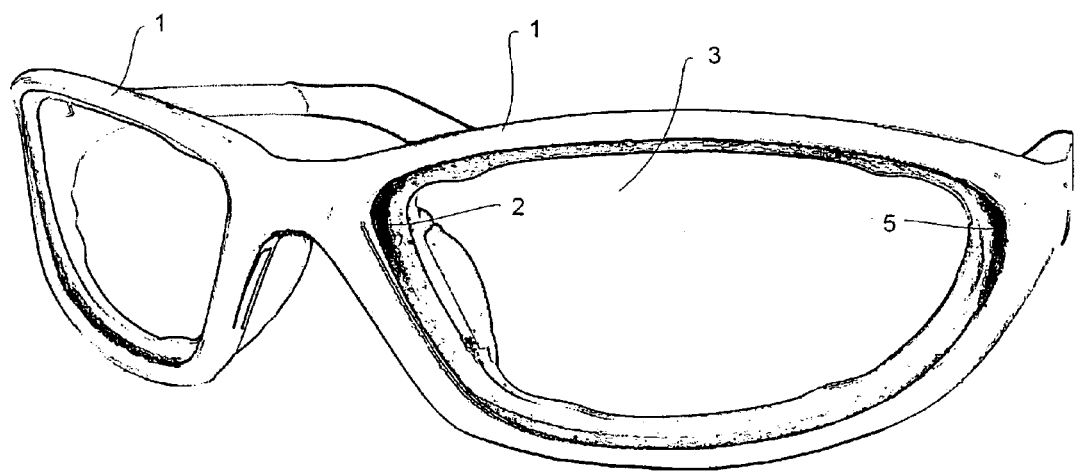

As illustrated in FIGS. 1A-1C, an integral biasing lens interchange system for glasses according to a first embodiment of the present invention includes an eyeglass frame having two eyewires or rims 1, each eyewire or rim 1 (hereinafter referred to as "eyewire") being the component of the frame that encircles one lens 3, and each eyewire 1 is provided with a deep groove 2 at a portion thereof for securely holding the lens 3, the deep groove of each eyewire is provided with an integral biasing spring 4 (FIG. 1B) that compresses to facilitate insertion and removal of a lens. When a lens is inserted into the eyewire, the lens may be pushed in the direction of compression of the spring 4, thereby compressing the spring. Due to the compression of the spring, the lens may be further inserted into the side of the eyewire having the spring than in a side of the eyewire furthest from the spring. The lens may be seated in the eyewire and released, thereby removing the majority of compression from the spring. Removal of the compression from the spring causes the spring to return toward its original, rest position, thereby pushing the seated lens back to be centered in the respective eyewire 1.

As shown in FIG. 1C, each eyewire may be further provided with a second deep groove 5 at a position furthest from the first deep groove. In this case, removal of the majority of compression from the spring causes the lens seated in the eyewire to be pushed back into the second deep groove, to be securely held in place. Each eyewire may further include opposing undercuts for retaining the lens. The opposing undercuts may be provided along an inner perimeter of the eyewire. The opposing undercuts may serve to provide a lens groove, such that a lens inserted therein is prevented from falling out of the eyewire by eyewire material surrounding the lens groove, and therefore surrounding an outer perimeter of the lens.

In an alternate embodiment, in addition to the first deep groove having the integral biasing spring therein, each eyewire may be provided with a groove formed in the inner perimeter of the eyewire, in which a lens may be seated. Further, a front and rear perimeter of the lens may be provided with a rim or overhang, which prevents a lens seated on the ledge from falling out of the eyewire. In this case, if a lens is pushed in the direction of the first groove having the spring to compress the spring, the lens may be seated on the ledge and released. Thus, the force of the spring pushes the lens into the groove provided by the ledge and overhanging rim to thereby secure the lens in place.

In the above embodiments, the lens may be pushed toward the spring to compress the spring, pushed into the eyewire to be seated on the ledge, and then released, wherein the spring force pushes the lens into the groove provided opposite the spring.

The groove having the integral biasing molded spring is preferably provided at the portion of the eyewires near a bridge or nose portion of the frame. However, the groove having the integral biasing molded spring may be provided at the outer portion of the eyewires, near temples of the frame, or at any other position along the periphery of the eyewire.

Further, the integral biasing molded spring of the present invention may serve to keep the lens under slight spring compression, thereby preventing the lens from rattling.

Figure 2A:
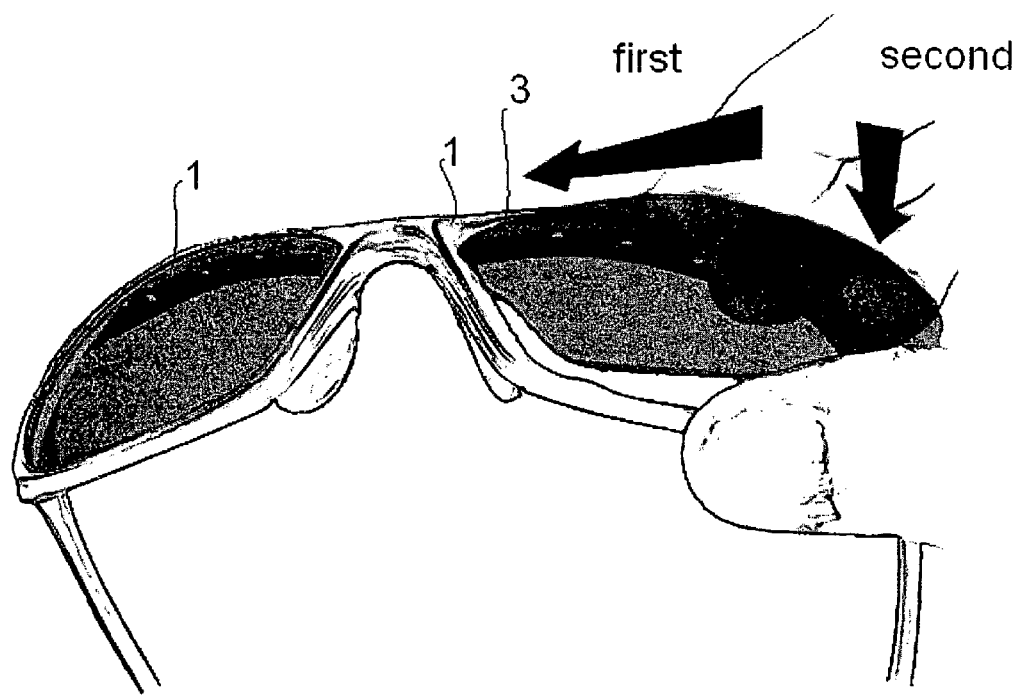
FIGS. 2A and 2B illustrate a method of operating the integral biasing lens interchange system of FIGS. 1A-1C.
Figure 2B:
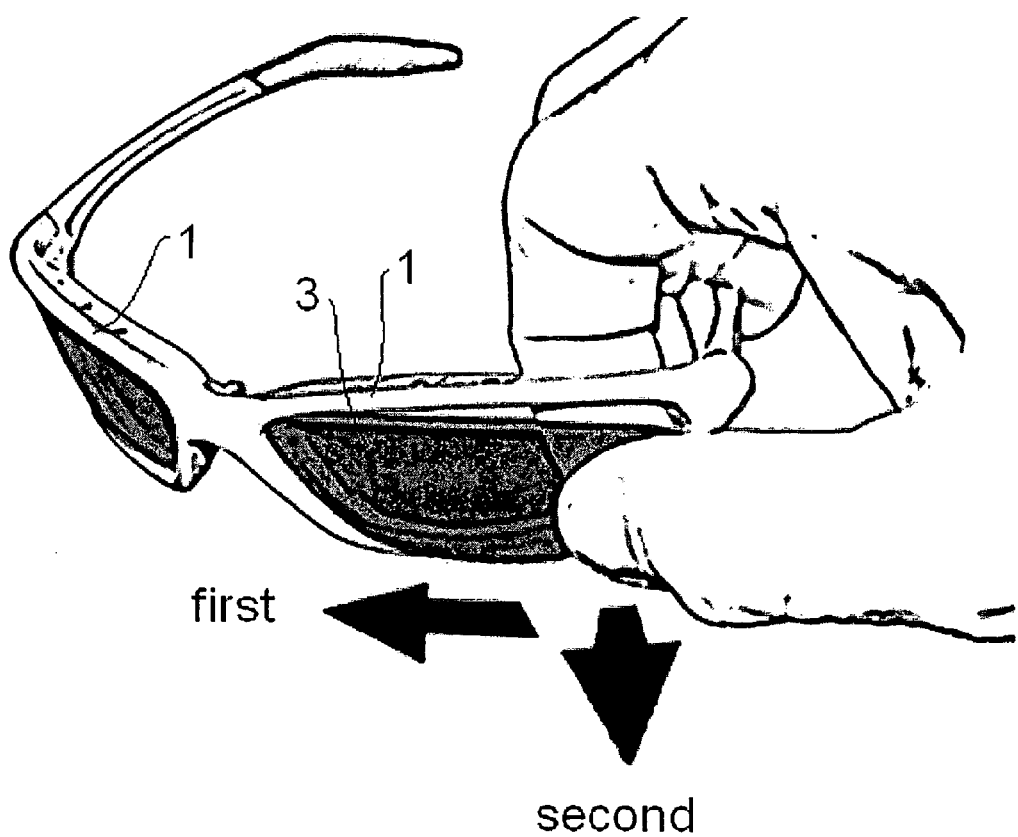

Operation of the integral biasing lens interchange system according to the first embodiment of the present invention will now be described with respect to FIGS. 2A-2B. As illustrated in FIG. 2A, a lens 3 may be inserted by pushing a side of the lens into the first deep groove 2 (FIGS. 1A and 1C) having the integral biasing molded spring 4 (FIGS. 1B and 1C) provided therein to compress the spring 4, seating a remainder of the lens onto the eyewire 1, and releasing the lens 3, wherein the biasing action of the spring 4 causes the lens 3 to be pushed into the second deep groove 5 (FIG. 1C) provided opposite the first deep groove 2. As shown in FIG. 2B, the lens 3 may be removed by pushing the lens in the direction of compression of the integral biasing spring 4 to compress the spring 4 so that a portion of the lens 3 in the second deep groove 5 clears the second deep groove 5, and pushing the lens 3 out of the eyewire 1.

Figure 3:
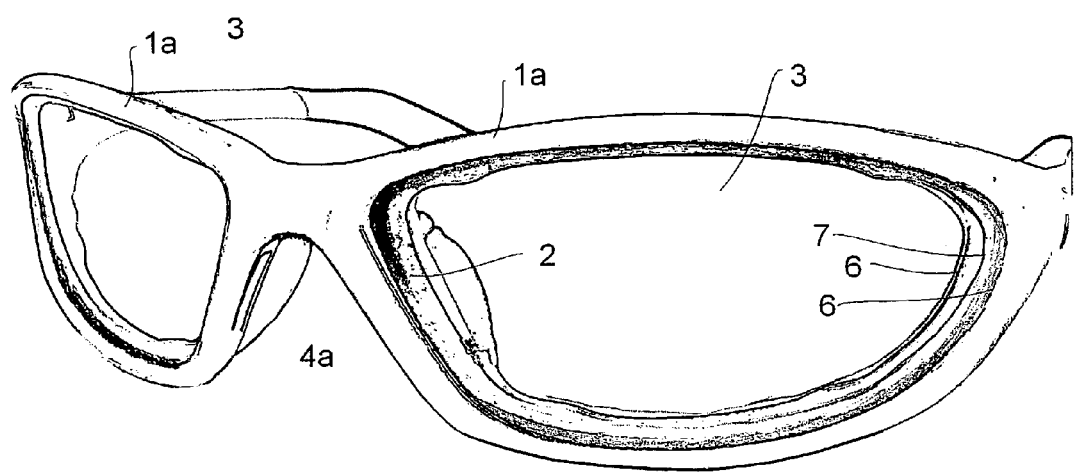
FIG. 3 illustrates a perspective view of an integral biasing lens interchange system according to a second embodiment of the present invention.

FIG. 3 illustrates an integral biasing lens interchange system for glasses according to a second embodiment of the present invention. As shown in FIG. 3, the integral biasing lens interchange system for glasses according to the second embodiment includes an eyeglass frame having two eyewires 1*a*. Each eyewire 1*a* is provided with a deep groove 2, and each deep grove 2 is provided with an integral biasing molded spring 4*a*. Each eyewire 1*a* is further provided with a ledge 7 formed on an inner perimeter of the respective eyewire 1*a* and an overhanging rim 6 formed around a front and back edge of the inner perimeter thereof. A lens 3 may be seated on the ledge 7 and the overhanging rim 6 prevents a lens 3 seated on the ledge 7 from falling out of the respective eyewire 1*a*.

In this case, upon compression of the integral biasing molded spring 4*a* by the lens 3, the integral biasing molded spring 4*a* is slightly pushed out of the respective eyewire, thereby allowing the lens 3 to be slid in the direction of compression of the spring 4*a* so that the portion of the lens 3 furthest from the spring 4*a* clears the overhanging rim 6. Thus, the lens 3 may be placed on the ledge 7 and released. Upon releasing the lens 3, the integral biasing action of the spring 4*a* pushes the lens 3 securely onto the ledge 7 within the overhanging rims 6 of the eyewire. Thus, the lens 3 is securely inserted into the eyewire 1*a*.

Removal of the lens is accomplished by sliding the lens 3 in the direction of compression of the integral biasing molded spring 4*a*. Compression of the spring 4*a* by the lens 3 pushes the spring 4*a* slightly out of the eyewire 1*a*. Thus, the lens 3 is permitted to be slid further in the direction of compression of the spring 4*a* so that the portion of the lens 3 furthest from the spring 4*a* clears the overhanging rim 6 to be removed.

Figure 4:
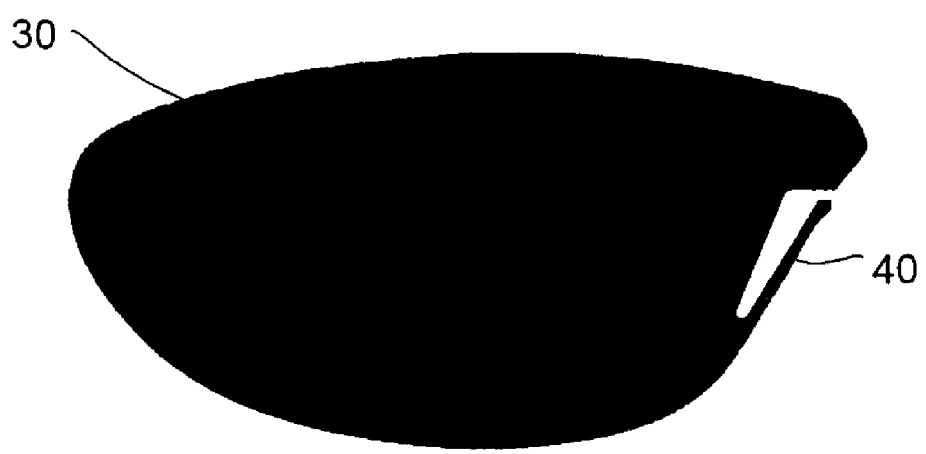
FIG. 4 illustrates a perspective view of an integral biasing lens for an integral biasing lens interchange system according to a third embodiment of the present invention.

According to a third embodiment of the present invention, an integral biasing lens interchange system for glasses includes an eyeglass frame having two eyewires, each provided with a deep groove at a portion thereof, and, as shown in FIG. 4, a lens 30 having an integral biasing molded spring 40 on a portion thereof corresponding to the portion of the eyewire having the deep groove, wherein the spring is compressed to facilitate insertion and removal of the corresponding lens. The eyewire may have a second deep groove formed opposite the first deep groove, and may have opposing undercuts in the inner perimeter thereof for retaining the lens.

The lens of the second and third embodiments may be inserted and removed in a manner similar to that described for the first embodiment with respect to FIGS. 2A and 2B.

In the above embodiments, a lens may be removed by pushing the lens in the direction of compression of the spring, wherein the lens is moved slightly in that direction, such that the portion of the lens furthest from the spring is moved away from the groove or ledge in which it is seated.

Thus, the portion of the lens furthest from the spring clears any rim or overhanging portion of the eyewire and can be easily pushed out of the eyewire. Then, the portion of the lens in the deep groove can easily be slid from the groove and the lens completely removed from the frame. A different lens, such as a clear lens, a ballistic lens, a prescription lens, or a polarized lens may then be inserted into the eyeglass frame as described above. Therefore, by the system of the present invention, an eyeglass lens may be quickly and easily changed, even in adverse conditions.

FIGS. 5A-5D and 6A-6C illustrate an integral biasing lens interchange system according to a fourth embodiment of the present invention. In the fourth embodiment of the present invention, a frame or a portion of a frame acts as a spring.

Figure 5A:
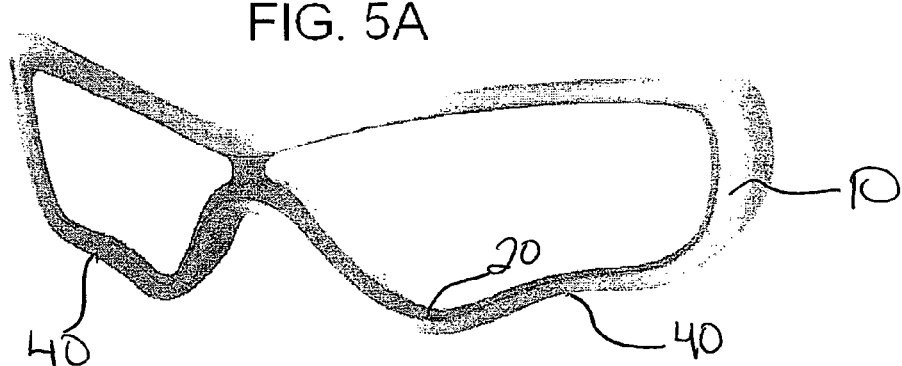
FIGS. 5A through 5D illustrate perspective views of an integral biasing lens interchange system according to a fourth embodiment of the present invention and a method of using the same.

As shown in FIG. 5A, a spring recurve area 40 is designed as an integral part of a frame 10. The spring recurve area 40 in FIG. 5A is provided within a bottom portion of the frame 10. However, the spring recurve area 40 may be disposed anywhere along the perimeter of a portion of an eyeglass frame that is designed to hold a lens, such as an eyewire. For example, the spring recurve area 40 may be disposed at a nasal, temple, or browbar/top portion of a frame or one or two eyewires of a frame. In FIG. 5A, the frame 10 is further provided with a lens groove 20, which may be an undercut portion of the frame 10, disposed along an inner perimeter thereof.

Figure 5B:
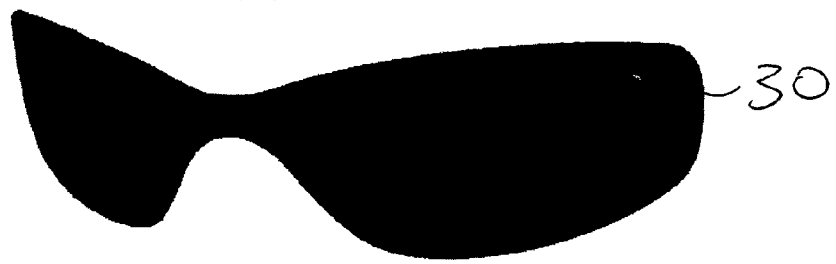
Figure 5C:
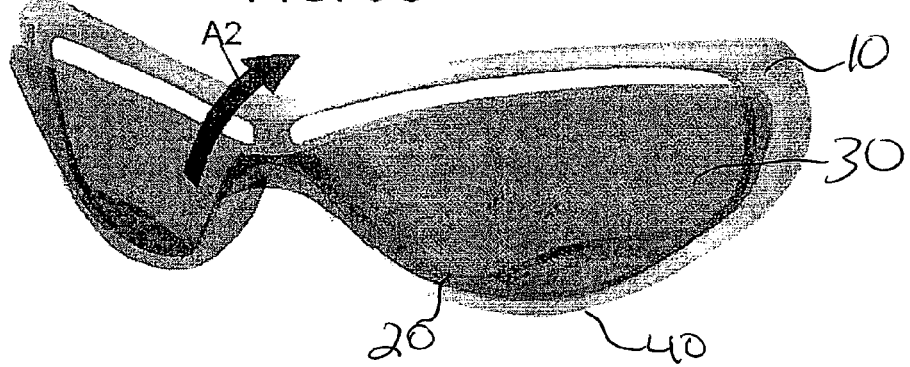
Figure 5D:
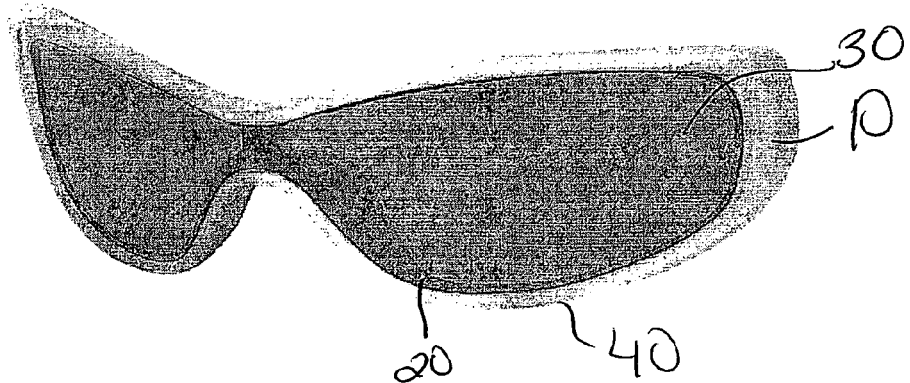

When a lens such as lens 30 of FIG. 5B is inserted into a bottom portion of the frame 10, the spring recurve area 40 becomes distended, or is deflected, so that the bottom portion of the lens 30 is able to be seated into the groove 20 provided at a bottom portion of the frame 10, as shown in FIG. 5C. The lens 30 is inserted into the bottom portion of the frame 10 by pushing the lens 30 in a direction thereof, as indicated by arrow number A1 in FIG. 6A. Then, the lens 30 is pivoted back toward the top of the frame 10 by pushing the lens 30 in a direction of the top of the frame 10, as indicated by arrow number A2 in FIGS. 5D and 6A. The lens is then pressed into the groove 20 at the bottom portion of the frame 10 and released. Spring tension in the spring recurve portion 40 of the frame 10 pushes the lens into the groove 20 at the top portion of the frame 10, thereby firmly seating the lens 30 in the frame 10 as shown in FIG. 5D.

Figure 6A:
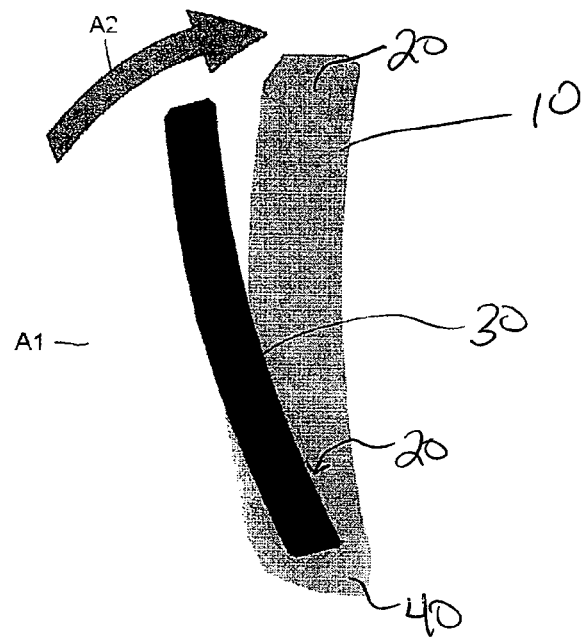
FIGS. 6A through 6C illustrate cross-sectional views of the integral biasing lens interchange system of FIGS. 5A through 5D.
Figure 6B:
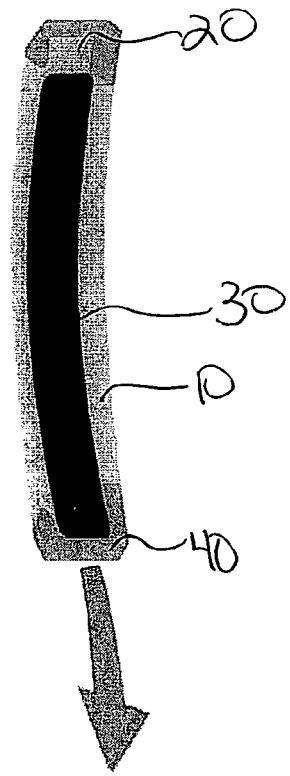
Figure 6C:
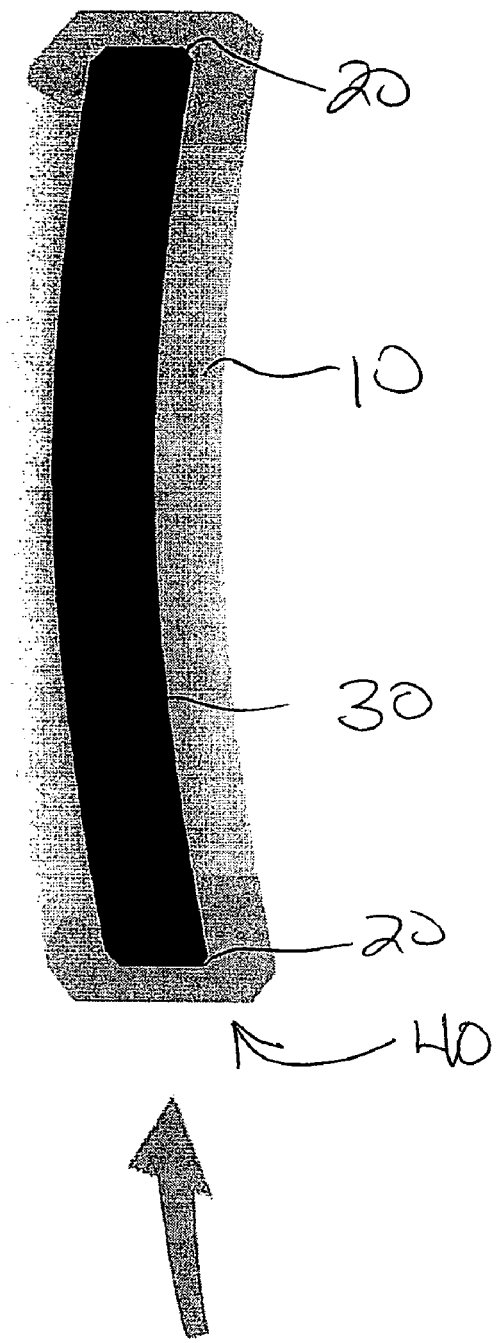

FIG. 6A illustrates a first step for inserting a lens of the integral biasing lens interchange system of the fourth embodiment. As shown in FIG. 6A, a lens 30 is first inserted by placing a bottom portion of the lens 30 into the groove 20 disposed at a bottom portion of the frame 10, and then pushing the lens 30 in the direction shown by arrow A1, so as to deflect or distend the spring recurve portion 40. Then, the lens 30 is pushed in the direction shown by arrow A2 of FIG. 6B, so that the lens 30 is within the frame 10 while maintaining the deflecting or distending of the spring recurve portion 40 of the frame 10, as shown in FIG. 6B. The lens 30 is then released, causing the spring recurve portion 40 of the frame 10 to release the stored energy, thereby pushing the lens 30 into the groove 20 disposed at the top portion of the frame 10, as shown in FIG. 6C.

In the fourth embodiment, when a lens 30 is positioned within the frame 10 or within eyewires of a frame, the frame and/or eyewires take the shape of the lens 30. In addition, the lens 30 is held in place by the slight spring action of the spring recurve portion 40 of the frame.

FIGS. 7-15 illustrate a fifth embodiment of the present invention.

FIG. 7 illustrates a front view of a lens interchange system for glasses according to the fifth embodiment of the present invention includes an eyeglass frame having two eyewires or rims 101 (hereinafter "eyewire"), each eyewire 101 being the component of the frame that encircles one lens 103 in a manner similar to that of the previously described embodiments. Although not illustrated therein, but as previously described and illustrated in FIGS. 1-6C, the frame may also include a pair of deep grooves that securely retain each lens 101 in a manner similar to that of the previous embodiments. A novel aspect of the fifth embodiment of the present invention is the presence of an interchange or secondary spring nose part 110 (hereinafter "interchange part 110") that is incorporated into the bridge area of the frame which rests on the nose of the wearer during normal use.

FIG. 8 illustrates an enlarged view of the frame relating to the bridge area comprising the interchange part 110. While the exemplary embodiment discussed below describes the interchange part 110 as being affixed to the frame by a base 111 using a fixing member that passes through the base and into the frame member, it is within the scope and spirit of the invention to form the frame with a groove instead of the insert or boss on the inner or outer surface of the frame wherein the fixing member pass through the base 111 and frame to attach the features to each other.

As shown in FIG. 8, the interchange part 110 includes a pair of legs 110a, 110b extending away from a base 111 in a diverging manner. The interchange part 110 can be manufactured from any suitable material, such as, for example, a molded plastic, metal and the like. Moreover, a nose piece or pad 112a, 112b is slidably inserted onto or over a substantial portion of a corresponding leg 110a, 110b. Furthermore, each leg 110a, 110b includes an upper post 114a, 114b extending away therefrom, the upper post 114a, 114b functioning as a lens hook, which will be described in further detail below. Moreover, the base 111 includes a through hole 111a formed therein to receive a fixing member, e.g., a screw, pin and the like, therein, which can be used to attach the interchange part 110 to the frame. As illustrated in FIG. 8, a leg 110b is biasable away from and back toward the corresponding lens 103 wherein a portion of the leg 110b extending away from the upper post 114b in a direction furthest from the base 111 is the portion of the interchange part 110 which is biasable.

FIGS. 9A-D illustrate different views of the interchange part 110. FIG. 9A illustrates a front view of the interchange part 110 wherein the legs 110a and 110b extend away from the base 111 having the through hole 111a formed therein. Each leg 110a, 110b has a corresponding upper post 114a, 114b extending away therefrom in a direction toward the rear or back surface of the frame. FIGS. 9B and 9C illustrate a rear view (FIG. 9B) and side view (FIG. 9C) of the interchange part 110. In addition to the upper post 114a, 114b, each corresponding leg 110a, 110b includes a pair of lower posts 116a, 116b and 118a, 118b extending in common direction as the upper post 114a, 114b. While the upper post 114a, 114b is not covered by the nose piece 112a, 112b, the lower posts 116a, 118a and 116b, 118b are covered by the nose piece 112a, 112b. FIG. 9D shows a fixing member, e.g., screw 119, inserted into the through hole 111a of the base 111.

FIG. 10A illustrates a side view of a nose piece 112a, 112b without the corresponding leg 110a, 110b inserted therein. The nose piece 112a, 112b having a groove formed therein that is configured to correspond to cover a substantial portion of the leg 110a, 110b as well as the pair of lower posts 116a, 118a or 116b, 118b. As shown in FIG. 10B, the leg 110a is slidably inserted into the groove wherein the nose piece 112a, 112b receives the lower posts 116a, 118b. It should be noted that it is within the scope of the present invention to provide the nose piece 114a, 114b with at least three holes or grooves that are configured to receive therein one of the lower posts 116a, 118a so that the height of the nose pad can be adjusted according to the comfort level of the wearer.

Upon inserting the leg 110a into the groove of the nose piece 114a, it can be seen that, as illustrated in FIG. 10C, while the lower posts 116a, 118a are covered by the nose piece 114a, the upper post 110a is not covered by the nose piece 114a and extends freely away therefrom. The upper post 110a, 110b retains the lens 103 in the frame by engaging a notch 103a (FIG. 8) defined in the lens 103. Thus, when the nose piece 114a is biased away from the frame or toward the other nose piece 114b, the upper post 114a slides out of the notch 103a, thereby releasing the lens 103, after which the wearer can remove the lens 103 from the frame. In other words, the interchange part 110 functions as a biased or spring based locking device that allows the wearer to change the lens 103 as needed either by manipulating the lens as described above with respect to the first embodiment or simply be squeezing at least one of the legs 110a and or 110b of the interchange part 110 to bias the leg 110a, 110b away from the frame. When the legs 110a, 110b are in the normal or unbiased state, or even when the frame is being worm by the wearer and the legs 110a, 110b are spread apart or away from each other, the upper posts 114a, 114b lock into the notch 103a formed in their respective lens 103, thereby locking the lens 103 into the frame.

FIGS. 11A-C illustrate a sixth embodiment of the interchange part 210 of the present invention. In this embodiment, the interchange part 210 functions in the same manner as the interchange part 110 of the fifth embodiment and is preferably manufactured from a malleable metal or other suitable materials that is bendable or deformed into a custom shape, as is the molded plastic interchange part 110. The interchange part 210 includes a pair of arms 210a, 210b that are attached to opposing ends of the base 210. Each leg 210a, 210b includes an upper post 214a, 214b that functions the same as the upper posts 114a, 114b of the interchange part 110 of the fifth embodiment. Each leg 210a, 210b also includes a pad receiving part 212b that is configured to be received by a similarly shaped groove 216 that is formed in a nose piece 215. The interchange part 210 functions in the same manner as the interchange part 110 of the fifth embodiment, and therefore the description is omitted herefrom to avoid redundancy.

FIGS. 12-15 illustrate the steps taken to insert a lens 103 into the frame of the eyeglass. The notch 103a or A of the lens 103 is inserted into the first groove 2 or nasal slot B formed in the frame. The lens 103 is then pushed toward the bridge (or center) of the frame and an outside edge C of the lens 103 is pushed down before the lens 103 is released. At this point, the lens 103 will snap into the outside edge C near the second groove 5 of the lens 103 and the upper post 114a or 114b engages or locks the lens 103 by engaging or wedged into the notch 103a. To remove a lens 103 from the frame, the above steps are reversed. For example, the wearer or user grabs the lens 103 at the outside edge C and the lens 103 is urged toward the bridge of the frame. The lens 103 is then pushed upward or away from the frame at the outside edge 103 and removed therefrom.

Exemplary embodiments of the present invention have been disclosed herein and, although specific terms are employed, they are used and are to be interpreted in a generic and descriptive sense only and not for purpose of limitation. For example, in the first embodiment illustrated in FIGS. 1-2B, the integral biasing spring 4 is positioned at a side of the nose bridge. In a modification of the first embodiment, the integral biasing spring 4' is positioned at a center of the nose bridge of the eyeglass frame as illustrated in FIG. 16A. The spring 4', which includes a hook and notch to secure the lens 3 in a manner similar to those of the previously described embodiments, is illustrated in FIG. 16B in an exploded view. FIG. 16C illustrates a bottom view of the modification. FIG. 16D is a schematic diagram illustrating the spring 4' at rest, wherein the dark region in the center of the three boxed meter 300 represents the extent to which the spring 4' may bend. FIG. 16E illustrates the spring 4' has been compressed as indicated by the arrow 301 since the dark region has decreased relative to the rest state shown in FIG. 16D. FIG. 16F illustrates the spring 4' when released as indicated by the arrow 302 to hold the lens 3 in place and at rest.

Moreover, although the exemplary embodiment shown in FIGS. 5A-5D is illustrated as having a one-piece, shield-type lens 30, the fourth embodiment of the invention may include two separate lenses and two separate eyewires, each eyewire being provided with a spring recurve portion.

In yet another example, the integral, biased, lens interchange system for glasses and goggles may include one or two eyewires for holding a corresponding lens, and an integral biasing molded spring provided in a groove of each eyewire or a separate component incorporated into the bridge region of the frame. Either mechanism may then be compressed to facilitate insertion and removal of the corresponding lens. The compression of each spring being designed to allow a respective lens to be further inserted into one portion of an eyewire than another, and action of the spring upon being released may push the lens back to be centered in the eyewire.

In yet another variation, a portion of the frame for glasses or goggles may be fashioned to have spring-like characteristics, to allow extension and compression of a portion of the frame.

In a further modification, an automatic lens locking system may be incorporated therein and which is automatically engaged when the eyewear is worn in that the eyewear locking mechanism. The locking system would be located in a portion of the nose part, and as such would inherently spread apart by a wedging action of the wearers nose causing the lens "hooks" to lock into the grooves or notches in the lens securing the lenses to the frame more positively. While worn, it would be extremely difficult to disengage the lens hooks due to the wedging action of the wearer's nose. The lens locking mechanism/nose part may be made of plastic or metal or a combination of any suitable material. The spring action locking part may be made as a separate part attached to the frame by screw(s), glue, ultrasonic welding, snap or press fit or any other suitable means or method and may also be integral to the frame by means of molding.

Additionally, the invention may includes an adjustable and/or self adjusting feature as a component of the invention in order to provide comfort and a customized fit. Such a feature may be incorporated in an embodiment of the invention where the nose part is bent to a custom shape or position if needed while maintaining the self adjusting features of the flexible or pliable parts which may be made of rubber or silicone or other suitable materials. The flexible part contains "flex grooves" or thin walled sections which allow for a desired bending in a particular direction which is most advantageous to the comfort of the wearer. The "flex grooves" allow the nose pads to conform to the individual wearers nasal contours more easily and readily than previous art due to the number and angles of the grooves. The adjustable flexible or pliable nose part may be adjusted for "ride height" by manually changing the position of the flexible rubber type nose part by lengthening or shortening the pad in relation to the frame by sliding the flexible part over detents or raised bumps on the nose post parts in order to best suit the individual wearers comfort and taste.

Accordingly, it will be understood by those of ordinary skill in the art that various changes in form and details may be made without departing from the spirit and scope of the present invention as set forth in the following claims.

What is claimed is:

1. An integral and biased lens interchange apparatus for use with eyewear, the eyewear including two lenses in a respective rim and a frame supporting the two lenses, the apparatus comprising:
   at least one groove on at least one inside portion of each rim to retain the lenses in the frame; and
   an interchange assembly on a bridge of the frame, the interchange assembly includes two legs, each leg extending along a different side of the bridge,
   wherein at least one of the two lenses includes a notch defined therein; and
   wherein at least one leg engages the notch to apply a bias on the corresponding lens and stabilize the corresponding lens in the frame.

2. The apparatus of claim 1, wherein the leg comprises a first end and a second end, the first end being fixably retained at the bridge and the second end being releasable engaged at the notch.

3. The apparatus of claim 2, wherein the leg comprises a first, second and third posts extending away from the leg.

4. The apparatus of claim 3, wherein the second post is located intermediate the first and third posts.

5. The apparatus of claim 3, wherein the first post is releasably engaged at the notch.

6. The apparatus of claim 3, wherein at least one of the second and third posts engages a nosepad provided therein.

7. The apparatus of claim 3, wherein the first, second and third posts extend in a common direction.

8. The apparatus of claim 2, wherein the interchange assembly comprises a fixing member that engages the first end of the at least one leg to fix the interchange assembly to the bridge.

9. The apparatus of claim 8, wherein the fixing member comprises a through hole defined therein.

10. The apparatus of claim 1, wherein at least one leg is formed of at least one from a malleable metal and a bendable material.

11. The apparatus of claim 1, wherein at least one of each leg engages the notch in the rim in at least one of a front portion of the lens and a back portion of the lens.

12. The apparatus of claim 1, wherein
   the bridge of the frame comprises two portions, each portion being adjacent to each lens; and
   both portions of the bridge are pushed apart when the apparatus is worn by a user and lock each lens into its respective frame.

13. The apparatus of claim 1, wherein the bridge of the frame is adjustable by a wearer.

14. An integral and biased lens interchange apparatus for use with eyewear, the eyewear including at least one lens and a frame having a rim supporting the at least one lens, the interchange apparatus comprising: a spring biasing member in a first groove of the rim located on a side of a bridge of the frame and defined therein, wherein the lens is biased by the spring biasing member and maintained in a proper location inside the frame, the lens comprising an integral biasing molded spring on a portion of the lens, wherein the molded spring compresses to facilitate insertion and removal of the lens from the rim.

15. The apparatus of claim 14, further comprising a second spring biasing member in a second groove defined in the rim located opposite the bridge of the frame.

16. The apparatus of claim 14, wherein the rim comprises one or more undercuts defined therein to prevent the lens from falling out of the rim.

17. The apparatus of claim 14, wherein the rim comprises a groove on at least one of a bottom portion of the rim and a top portion of the rim and defined therein.

18. The apparatus of claim 14, wherein the integral biasing molded spring is located on a portion of the lens corresponding to the location of the first groove.

19. The apparatus of claim 14, wherein the integral biasing molded spring is located on a portion of the lens corresponding to the location of the second groove.

20. The apparatus of claim 14, further comprising:
   a ledge on an inner perimeter of the eyewear; and
   an overhanging rim around a front and back edge of the inner perimeter of the eyewear; wherein
   each lens is placed on the ledge and within the overhanging rim.

21. The apparatus of claim 14, wherein
   the bridge of the frame comprises at least one portion adjacent to the at least one lens; and
   the at least one portion of the bridge is pushed into the at least one lens when the apparatus is worn by a user and locks the at least one lens into the frame.

22. The apparatus of claim 14, wherein the bridge of the frame is adjustable by a wearer.

23. An integral and biased lens interchange apparatus for use with eyewear, the eyewear including at least one lens and a frame having a rim supporting the at least one lens, the interchange apparatus comprising: a spring biasing member in a first groove of the rim located on a side of a bridge of the frame and defined therein, wherein the lens is biased by the spring biasing member and maintained in a proper location inside the frame, at least one of the lenses comprising an integral biasing molded spring on a portion of the lens, wherein the molded spring compresses to facilitate insertion and removal of the lens from the rim.

24. The apparatus of claim 23, wherein the integral biasing molded spring is located on a portion of the lens corresponding to at least one of the location of the first groove and the second groove.

25. An integral and biased lens interchange apparatus for use with eyewear, the eyewear including an integral lens and a frame having a rim with a groove supporting the integral lens defined therein, the interchange apparatus comprising:
   a spring biasing member being an integral part of the rim.

26. The apparatus of claim 25, wherein the spring biasing member is an integral part of a bottom portion of the rim.

* * * * *